(12) United States Patent
Faraon Chaul Huerta

(10) Patent No.: US 8,251,100 B2
(45) Date of Patent: Aug. 28, 2012

(54) NEEDLE-TYPE STEPPED CYLINDRICAL STOPPER FOR AUTOMATIC CONTROL OF WATER CONSUMPTION IN PIPELINES

(76) Inventor: Adma Elena Faraon Chaul Huerta, Mexico City (MX)

( * ) Notice: Subject to any disclaimer, the term of this patent is extended or adjusted under 35 U.S.C. 154(b) by 0 days.

(21) Appl. No.: 12/922,237

(22) PCT Filed: Mar. 19, 2008

(86) PCT No.: PCT/MX2008/000043
§ 371 (c)(1),
(2), (4) Date: Sep. 13, 2010

(87) PCT Pub. No.: WO2009/116846
PCT Pub. Date: Sep. 24, 2009

(65) Prior Publication Data
US 2011/0017333 A1 Jan. 27, 2011

(51) Int. Cl.
*F16D 1/04* (2006.01)
(52) U.S. Cl. ............... 138/46; 138/45; 138/42; 137/504
(58) Field of Classification Search .............. 138/46, 138/45, 42; 137/504
See application file for complete search history.

(56) References Cited

U.S. PATENT DOCUMENTS

| | | | |
|---|---|---|---|
| 3,431,944 A | 3/1969 | Sakuma | 138/45 |
| 3,593,742 A * | 7/1971 | Taylor | 137/504 |
| 3,635,254 A * | 1/1972 | Mitchell | 138/45 |
| 3,918,481 A | 11/1975 | Doe et al. | 137/504 |
| 4,011,894 A * | 3/1977 | Barnes | 138/46 |
| 4,075,294 A * | 2/1978 | Saito et al. | 261/34.2 |
| 4,437,493 A * | 3/1984 | Okuda et al. | 138/45 |
| 4,962,792 A | 10/1990 | Chaul | 138/42 |

FOREIGN PATENT DOCUMENTS

| | | |
|---|---|---|
| EP | 0472798 A2 | 3/1992 |
| JP | 59106771 A | 6/1984 |
| MX | 166751 | 2/1993 |
| MX | 180756 | 2/1996 |
| WO | 9838555 A1 | 9/1998 |

OTHER PUBLICATIONS

International Search Report for PCT/MX2008/000043, Date of completion of Search is Sep. 19, 2008, 9 Pages.

* cited by examiner

*Primary Examiner* — Patrick F Brinson
(74) *Attorney, Agent, or Firm* — Brooks Kushman P.C.

(57) ABSTRACT

The invention in question relates to a needle-type stepped cylindrical stopper for automatic control of water consumption in pipelines, of two types, each type having two sections for automatically controlling water consumption, irrespective of the water pressure in the line or when the taps are opened, for use in automatic water-saving devices and pressure-sensitive flow controllers, such as to enable, with a single automatic water-saving device, incorporating the needle-type stepped stopper of this invention, automatic control of minimum water consumption, from 4.0 liters per minute as a minimum at a maximum static pressure of 0.2 kilograms per square centimeter up to a maximum water consumption of 10.0 liters per minute at a maximum static pressure of 6.0 kilograms per square centimeter.

2 Claims, 2 Drawing Sheets

NEEDLE-TYPE STEPPED CYLINDRICAL STOPPER FOR AUTOMATIC CONTROL OF WATER CONSUMPTION IN PIPELINES

TECHNICAL FIELD OF THE INVENTION

The present invention relates to a Needle-type stepped cylindrical stopper for automatic control of water consumption in pipelines, which has application in the field of technologies that allow the handling and control of fluid flow, specifically water, in both industrial and domestic use.

BACKGROUND

According to the state of the art the Mexican Patents MX 161751 and MX 180756, pressure-sensitive water saving devices are protected; however, there are patents in other countries that do not meet with the object of supplying with a single water saver and flow controller, regardless of the water pressure in the pipeline or the opening of the taps, a minimum water consumption of 4.0 liters/minute at a minimum static pressure of 0.2 Kg/cm$^2$, and provide a maximum water consumption of 10.0 liters/minute at a maximum static pressure of 6.0 Kg/cm2. Because of which the stopper design does not meet the minimum and maximum consumption; therefore, they only meet the water consumption in low, medium or high pressure. In the above mentioned patents, the cylindrical stopper is flat on the upper part and causes a high pressure drop and loss of flow at low static pressure, and thereby do not meet the minimum water consumption, rather than they only meet the specific water consumption for which were designed; due to the aforesaid there is a need to develop a needle-type stepped cylindrical stopper according to the current invention, which in its two design embodiments has two sections each one, that combined automatically control water consumption from low static pressure to high static pressure, regardless of the water pressure in the pipeline or the opening of the taps. The existing water saving devices are not automatic and in order to provide a specific water consumption according to water pressure in the pipeline, they use different designs of flow restriction devices or manual flow controllers, that only serve to a certain pressure and consumption with the risk of consuming more water than the necessary specified for low, medium or high pressure. With current designs of restriction devices, the water consumption can not be controlled automatically, since such consumption varies according to the water pressure in the pipeline and the opening of the taps; therefore, once the design of water restriction device has been calibrated to provide a consumption depending on pressure and opening of the taps to increase or decrease the water pressure in the pipeline and varying the opening of the taps or manually moving the water saving device, occurs a considerable increase or decrease in the water consumption.

Due to the above mentioned, there is the need of develop the current needle-type stepped cylindrical stopper, which in its two design embodiments has in each one two sections, that combined, automatically control the water consumption from a low static pressure regardless of the water pressure in the pipeline or the opening of the taps.

OBJECTS OF THE INVENTION

The object of the current invention is to provide a device comprising a needle-type mechanism for automatic control of water consumption in pipelines for use in automatic water saving devices.

Another object of the invention is that the device can be used in pressure-sensitive flow controllers, so that with a single water saver the water consumption can be automatically controlled.

Other aspects and advantages of the current invention will be more clear and evident from the description of the invention as well as the drawings that with illustrative but not limitative character are annexed, and disclosed below.

DESCRIPTION OF THE INVENTION

Figure 1:
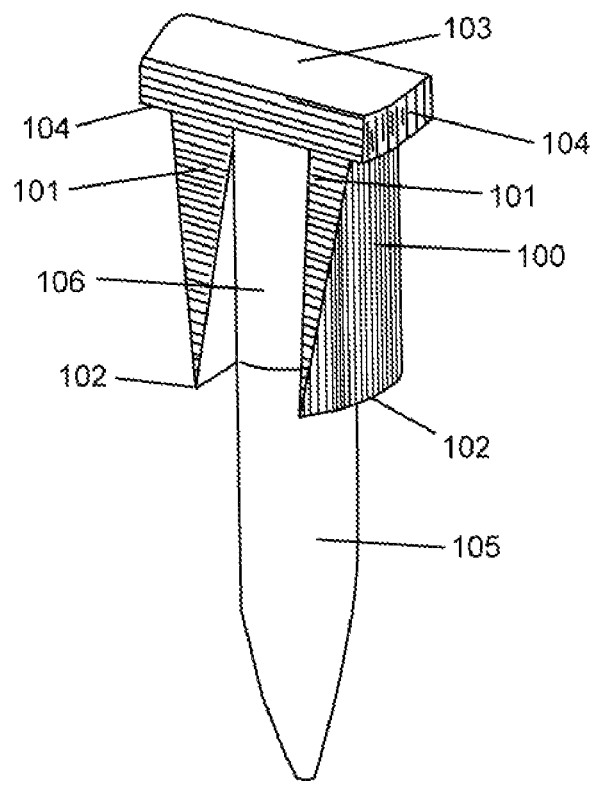
FIG. 1 shows a side view of the needle-type stepped cylindrical stopper (100) for automatically controlling the water consumption in pipelines for use in automatic water savers and pressure-sensitive flow controllers. In one embodiment the needle-type stepped cylindrical stopper (100) has in the lower section a needle (105) and in the upper section has two inclined symmetrical lateral planes (101) which begin at the step (102) of the needle-type stepped cylindrical stopper (100) ending in a flat section (103) of 2 to 3 millimeters wide as maximum, having a flange (104) that serves as stop for a conical spring (204). The upper section has two outer slots (106) one on each inclined symmetrical lateral plane (101).
Figure 3:
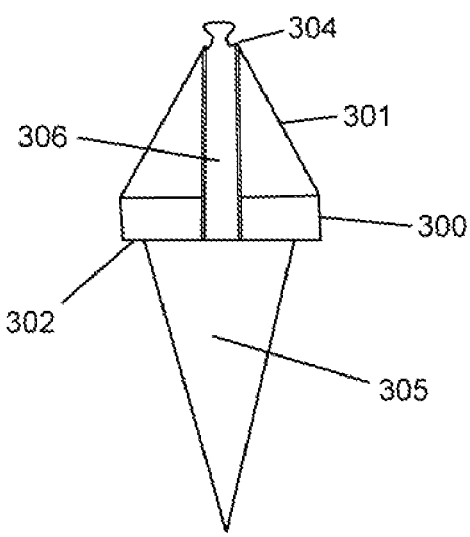
FIG. 3 shows a front view of a needle-type stepped cylindrical stopper (300) for automatically controlling the water consumption. In the second embodiment of the invention, the needle-type stepped cylindrical stopper (100) comprises an upper needle (301) which begins at the step (302) ending in a section that at the tip has a slot (304) that serves as a retention for a conical spring (204), the needle-type stepped cylindrical stopper (300) is housed inside the body (200) according to FIG. 2 of any design of the automatic water-saving and pressure-sensitive flow controller device having in its lower section, a needle (305) which controls the minimum water consumption of 4.0 liters/minute at a minimum static pressure of 0.2 Kg/cm2, and having in the upper needle (301) two symmetrical slots (306) at 180 degrees one to another. Likewise, when the flat section of the step (102) of the needle-type stepped cylindrical stopper (100) is in contact according to FIGS. 1 and 2, as well as the step (302) of the needle-type stepped cylindrical stopper (300) as in FIG. 3 with the flow controller washer (202), allows the water starts to flow through the slots (106) and (306).
Figure 2:
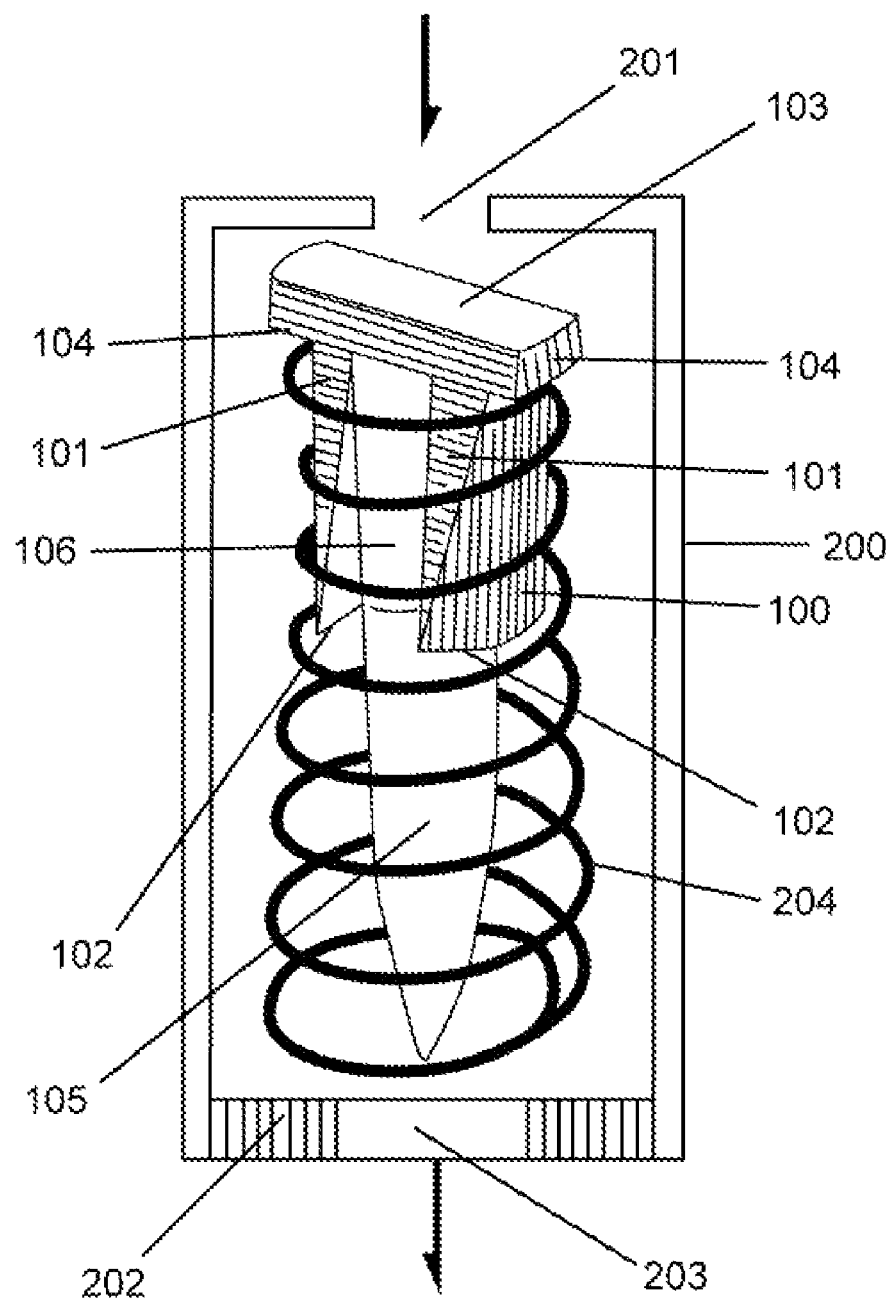
FIG. 2 shows a side view of the needle-type stepped cylindrical stopper (100) for automatically controlling the water consumption in pipelines and for use in automatic water savers and pressure-sensitive flow controllers; wherein the needle-type stepped cylindrical stopper (100) has in its upper section two inclined symmetrical lateral planes (101) which begin at the step (102) ending in a flat section (103) having a maximum wide ranging between 2 to 3 millimeters, which in turn has a flange (104) that serves as a stop to a conical spring (204), likewise, the needle-type stepped cylindrical stopper (100) is housed inside the body (200) of any design of automatic water-saving and pressure-sensitive flow controller having a fluid inlet hole (201). Additionally, below of the step (102) specially in the lower section of the needle-type stepped cylindrical stopper (100) there is a needle (105), while in the two inclined symmetrical lateral planes (101) are some slots (106) for automatically controlling water consumption.

The novel aspects and characterized part of the current invention specifically refer to a needle-type stepped cylindrical stopper for automatic control of water consumption in pipelines that currents two embodiments, wherein each embodiment has two sections, that combined, automatically control water consumption from low static pressure to medium static pressure and from medium static pressure to high static pressure, regardless of the water pressure in the pipeline or the opening of the taps for use in automatic pressure-sensitive water saving flow controller devices.

In a first design embodiment, the needle-type stepped cylindrical stopper of the current invention, has an upper section comprising two inclined symmetrical lateral planes beginning at the step of the Needle-type stepped cylindrical stopper ending in a flat section of 2 to 3 millimeters wide, which has a flange serving as stop and to retain a conical spring that prevents a high pressure drop and flow loss at low static pressure; in the two inclined symmetrical lateral planes there are disposed two slots which combined with the diameter of the lower needle and the diameter of the fluid output hole, control the water consumption from a medium static pressure of about 1.0 Kg/cm2 with a minimum water consumption of 4.0 liters/minute to a high static pressure of 6.0 Kg/cm2 with a maximum water consumption of 10.0 liters/minute, furthermore, in the lower section of the needle-type stepped cylindrical stopper a needle is placed, which combined with the upper flat section of 2 to 3 millimeters wide as maximum, which results from the two inclined symmetrical planes, with the back pressure of the conical spring and the flow pressure, the water consumption is controlled from low static pressure to medium static pressure.

In a second design embodiment, the needle-type stepped cylindrical stopper is comprised of two needles, an upper needle which combined with the lower needle automatically control the water consumption from a low static pressure of 0.2 Kg/cm2 with a minimum water consumption of 4.0 liters/minute to a medium static pressure of 1.0 Kg/cm$^2$ with a minimum water consumption of 4.0 liters/minute, wherein the upper needle has two symmetrical lateral slots at 180 degrees and moreover disposing it very close to a section having at the tip a box or slot (304) which in turn serves to retain a conical spring (204); and due to the back pressure of the conical spring combined with the flow pressure, the diameter of the upper needle and the diameter of the lower needle, current a lower pressure drop and flow loss at low static pressure, thus allowing a water consumption greater to 4.0 liters/minute as minimum at a minimum static pressure of 0.2 Kg/cm$^2$ in order to provide more comfort to the user without exceeding the necessary maximum water consumption.

Using the needle-type stepped cylindrical stopper of the current invention, when in the pipeline a medium static pressure of approximately 1.0 Kg/cm$^2$ has been achieved, the step of the Needle-type stepped cylindrical stopper in its two embodiments comes into contact with a flow controller washer and at that time the water consumption automatically decreases to no less than 4.0 liters/minute and as the static water pressure on the pipeline and the opening of the taps is increased to more than 1.0 Kg/cm$^2$, the water consumption automatically increases to achieve a maximum water consumption of 10.0 liters/minute at a maximum static pressure of 6.0 Kg/cm2 regardless of the opening of the taps.

Likewise, in accordance with the embodiments of the needle-type stepped cylindrical stopper, there are two outer slots that combined with the diameter of the fluid output hole of a flow controller washer and the diameter of the lower needles, the minimum water consumption of 4.0 liters/minute at a medium static pressure of approximately 1.0 Kg/cm$^2$ is controlled, and as the water pressure in the pipeline and the opening of the taps increase to more than 1.0 Kg/cm$^2$, the water consumption is increased automatically and proportional up to reach a maximum consumption of 10.0 liters/minute at a static pressure of 6.0 Kg/cm$^2$ and in all intermediate static pressures regardless of the opening of the taps, thus allowing the use of a single automatic water saver and pressure-sensitive flow controller having the needle-type stepped cylindrical stopper of the current invention incorporated, for low, medium and high pressure.

It is important mentioning that with a single automatic water saver and flow controller device which incorporates any embodiment of the needle-type stepped cylindrical stopper of the current invention, the water is saved and the flow is automatically controlled regardless of the water pressure in the pipeline or the opening of the taps, as the water pressure in the pipeline and the opening of the taps increase, the water flow automatically increases and the Needle-type stepped cylindrical stopper in its two embodiments is entrained by the fluid up to the flow controller washer and the lower needle is introduced into the fluid outlet hole of the flow controller washer.

Complementarily, the needle-type stepped cylindrical stopper of the current invention in its two embodiments, each one comprises two sections that combined automatically control the water consumption from low static pressure to medium static pressure, and from medium static pressure to high static pressure, wherein said sections beginning with the upper flat section of 2 to 3 millimeters wide as maximum resulting from the two inclined symmetrical upper planes or from the tip of the section of 2 to 3 millimeters wide as maximum of the upper needle. The other flow control section, controls the water consumption from a medium static pressure of approximately 1.0 Kg/cm$^2$ to a high static pressure of 6.0 Kg/cm$^2$, which begins with the step of the needle-type stepped cylindrical stopper, with the needle and the two slots disposed in the two inclined symmetrical planes, wherein the step of the needle-type stepped cylindrical stopper at the moment of having contact with the flow controller washer, starts to control the water consumption from medium static pressure to high static pressure.

In order to provide a major advantage in accordance with the above disclosed embodiments, the needle-type stepped cylindrical stopper combines the back pressure of the conical spring, the diameter of the fluid output hole in the flow controller washer and the two inclined symmetrical upper planes, for automatically controlling water consumption from a low static pressure of 0.2 Kg/cm$^2$ to a medium static pressure of approximately 1.0 Kg/cm$^2$ and with the combination of the two external lateral slots that are in the upper needle with the hole of the flow controller washer and the diameter of the lower needle, the water consumption is controlled at medium static pressure and from medium static pressure to high static pressure regardless of water pressure in the pipeline or the opening of the taps to fulfill with a controlled water consumption.

Finally, the needle-type stepped cylindrical stopper of the current invention in either of its two embodiments, may be used as a single water saver for automatically controlling water consumption at all the static pressures without risk of error and moreover its operational structure, design, parts and manufacturing materials allow that can be used together or separately to provide an automatic water saving and flow controller device

The invention claimed is:

1. A needle-type stepped cylindrical stopper system for automatic control of water consumption, comprising:
   an upper section including a needle disposed very near of a section having a tip and having two inclined symmetrical lateral planes that begin at a step of the needle-type stepped cylindrical stopper ending in the tip, the two inclined symmetrical lateral planes having two slots, the tip having one of a tip box or a tip slot adjacent to the two inclined symmetrical planes; and a lower section having a second needle connected to the two inclined symmetrical lateral planes and spaced apart from the flange, wherein the combination of the first and second needles is capable of automatically controlling water consumption from low static pressure of 0.2 $Kg/cm^2$ up to a medium static pressure of 1 $Kg/cm^2$.

2. The stopper system of claim 1, further comprising:

a housing about the upper and lower sections; and a conical spring about the upper and lower sections and within the housing, wherein the tip box or tip slot is adapted to retain the conical spring.

* * * * *